US008849648B1

(12) United States Patent
Bangalore et al.

(10) Patent No.: US 8,849,648 B1
(45) Date of Patent: Sep. 30, 2014

(54) SYSTEM AND METHOD OF EXTRACTING CLAUSES FOR SPOKEN LANGUAGE UNDERSTANDING

(75) Inventors: Srinivas Bangalore, Morristown, NJ (US); Narendra K. Gupta, Dayton, NJ (US); Mazin G. Rahim, Warren, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 1050 days.

(21) Appl. No.: 10/329,138

(22) Filed: Dec. 24, 2002

(51) Int. Cl.
*G06F 17/27* (2006.01)

(52) U.S. Cl.
USPC ....... 704/9; 704/1; 704/10; 704/231; 704/251

(58) Field of Classification Search
USPC ............................................. 704/9, 231, 251
See application file for complete search history.

(56) References Cited

U.S. PATENT DOCUMENTS

| | | | | |
|---|---|---|---|---|
| 4,773,009 | A * | 9/1988 | Kucera et al. | 715/260 |
| 4,809,333 | A * | 2/1989 | Taylor | 704/252 |
| 4,864,502 | A * | 9/1989 | Kucera et al. | 704/8 |
| 5,029,084 | A * | 7/1991 | Morohasi et al. | 704/9 |
| 5,079,700 | A * | 1/1992 | Kozoll et al. | 715/207 |
| 5,181,250 | A * | 1/1993 | Morgan et al. | 704/270 |
| 5,479,563 | A * | 12/1995 | Yamaguchi | 704/232 |
| 5,526,463 | A * | 6/1996 | Gillick et al. | 704/251 |
| 5,890,103 | A * | 3/1999 | Carus | 704/9 |
| 5,960,384 | A * | 9/1999 | Brash | 704/9 |
| 6,061,675 | A * | 5/2000 | Wical | 706/45 |
| 6,151,576 | A * | 11/2000 | Warnock et al. | 704/260 |
| 6,157,911 | A * | 12/2000 | Kuroda | 704/251 |
| 6,192,110 | B1 * | 2/2001 | Abella et al. | 379/88.01 |
| 6,295,529 | B1 * | 9/2001 | Corston-Oliver et al. | 707/715 |
| 6,393,399 | B1 * | 5/2002 | Even | 704/257 |
| 6,708,148 | B2 * | 3/2004 | Gschwendtner et al. | 704/235 |
| 6,714,939 | B2 * | 3/2004 | Saldanha et al. | 1/1 |
| 6,810,375 | B1 * | 10/2004 | Ejerhed | 704/9 |
| 6,823,312 | B2 * | 11/2004 | Mittal et al. | 704/271 |
| 6,859,931 | B1 * | 2/2005 | Cheyer et al. | 719/317 |
| 6,973,428 | B2 * | 12/2005 | Boguraev et al. | 704/251 |
| 7,240,006 | B1 * | 7/2007 | Brocious et al. | 704/270 |
| 2002/0026435 | A1 * | 2/2002 | Wyss et al. | 707/1 |

(Continued)

OTHER PUBLICATIONS

Zechner et al., Building Chunk Level Representations for spontaneous speech in Unrestricted Domains: The CHUNKY System and Its Application to Reranking NBest Lists of a Speech Recognizer, May 5, 1997, Citeseer.*

(Continued)

*Primary Examiner* — Lamont Spooner

(57) ABSTRACT

A clausifier and method of extracting clauses for spoken language understanding are disclosed. The method relates to generating a set of clauses from speech utterance text and comprises inserting at least one boundary tag in speech utterance text related to sentence boundaries, inserting at least one edit tag indicating a portion of the speech utterance text to remove, and inserting at least one conjunction tag within the speech utterance text. The result is a set of clauses that may be identified within the speech utterance text according to the inserted at least one boundary tag, at least one edit tag and at least one conjunction tag. The disclosed clausifier comprises a sentence boundary classifier, an edit detector classifier, and a conjunction detector classifier. The clausifier may comprise a single classifier or a plurality of classifiers to perform the steps of identifying sentence boundaries, editing text, and identifying conjunctions within the text.

12 Claims, 2 Drawing Sheets

(56) References Cited

U.S. PATENT DOCUMENTS

| | | | |
|---|---|---|---|
| 2002/0095292 A1* | 7/2002 | Mittal et al. | 704/270 |
| 2002/0178002 A1* | 11/2002 | Boguraev et al. | 704/235 |
| 2004/0107088 A1* | 6/2004 | Budzinski | 704/10 |

OTHER PUBLICATIONS

Oh et al., (Stochastic natural language generation for spoken dialog systems), Jul.-Oct. 2002, Computer Speech and Language vol. 16, Issues 3-4, pp. 387-407.*

Heeman et al., Tagging speech Repairs, Proceedings of the workshop on Human Language Technology, 1994, ACL, pp. 187-192.*

Stolcke et al., Automatic Linguistic Segmentation of Conversational Speech, Fourth International Conference on Spoken Language Processing, Citeseer, 1996 pp. 1-4.*

Gupta et al. (Gupta), Extracting Clauses for Spoken Language Understanding in Conversational Systems, Jul. 2002, EMNLP, ACL, pp. 273-280.*

Schapire et al., "Improved Boosting Algorithms Using Confidence-rated Prediction", 1998, Proceedings of the Eleventh annual Conference on Computational Learning Theory, pp. 1-12.

Meteer et al., "Modeling Conversational Speech for Speech Recgnition", Proceedings of the Conference on Empirical Methods in Natural Language Processing, pp. 33-47, 1996.

Schapire et al., Experiments with a New Boosting Algorithm, 1996, Morgan Daufman Publishers, Inc, pp. 1-16.

Witt et al. (Enhancing speech corpus resources with multiple lexical tag layers), 2000, LREC 2000 Proceedings, pp. 1-5.

* cited by examiner

SYSTEM AND METHOD OF EXTRACTING CLAUSES FOR SPOKEN LANGUAGE UNDERSTANDING

RELATED APPLICATION

The present application is related to U.S. patent application Ser. No. 10/310,596, filed Dec. 5, 2002, now U.S. Pat. No. 8,190,436, issued May 29, 2012, the contents of which are incorporated herein by reference.

BACKGROUND OF THE INVENTION

1. Field of the Invention

The present invention relates to spoken dialog systems and more specifically to a system and method of extracting clauses from received speech to improve spoken language understanding.

2. Discussion of Related Art

Spoken language understanding in human-computer dialog systems must accommodate the characteristic features of human verbal communications. Most notable of such features are: (a) ungrammaticality, (b) presence of dysfluencies like repeats, restarts, and explicit/implied repairs, (c) absence of essential punctuation marks, e.g., end of sentence and coma-separated enumerations and (d) unpredictable word errors introduced by speech recognizers. These features make the word strings generated by the recognizers, or even generated by literal transcription of speech, syntactically and semantically incoherent.

Current spoken dialog systems circumvent these problems by classifying the entire input directly into a limited number of actions that the dialog system can perform. Such techniques work well when there are a small number of actions, such as in the case of call routing systems. However, such systems do not scale well for tasks that require a very large number of classes—e.g., problem-solving tasks—or when fine-grained analysis of the user's utterance is needed.

The tasks of identifying sentence boundaries, speech repairs and dysfluencies have been a focus of speech parsing research for several years. Most of the previous approaches cope with dysfluencies and speech repairs in the parser by providing ways for the parser to skip over syntactically ill-formed parts of an utterance. In more recent work, the problem of speech parsing is viewed as a two-step process. A preprocessing step is a used to identify speech repairs before parsing begins.

What is needed in the art is an improved clausifier that does not constrain speech edits and restarts to conform to a particular structure. What is further needed in the art is an improved clausifier that processes text more efficiently to generate a set of clauses for spoken language understanding.

SUMMARY OF THE INVENTION

The clausifier and method of generating a set of clauses disclosed herein address the deficiencies of the prior art. To develop deeper semantic representations of user utterances, the present invention not only identifies speech repairs but segments the input utterance into "clauses" as well. A preferred definition of a clause is a self-contained, syntactic unit embodying a single concept in the form of a single subject-predicate set. However, other syntactic units may also be isolated as clauses.

This disclosure provides generative and discriminative models for the task of detecting sentence boundaries, identifying speech repairs and editing them out and identifying coordinating conjunctions to break the sentences into clausal units. A general term for the models or modules that perform these tasks may be a "classifier" although other terms may be utilized.

A first embodiment of the invention relates to a module that extracts clauses used for spoken language understanding in a spoken dialog system. The module may be termed a clausifier, a set of classifiers, or other terms to describe its operation. The module comprises various sub-components including a boundary classifier that detects sentence boundaries within a speech utterance text, an editing classifier that edits the speech utterance text to remove unneeded words, and a conjunction classifier that detects conjunctions within the speech utterance text, wherein the module outputs annotated text having identifiable clauses according to the sentence boundaries, edited text, and conjunctions within the speech utterance text. While the present invention is preferably described in terms of three sub-components to the module, these may be combined into two components, a single component or more than three components that perform similar functions of detecting sentence boundaries, editing, and identifying coordinating conjunctions to generate a set of clauses for use in spoken language understanding. Accordingly, the specific structure of the software module is not important or limiting to the present invention.

Additional features and advantages of the invention will be set forth in the description which follows, and in part will be obvious from the description, or may be learned by practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth herein.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE INVENTION

Figure 1:
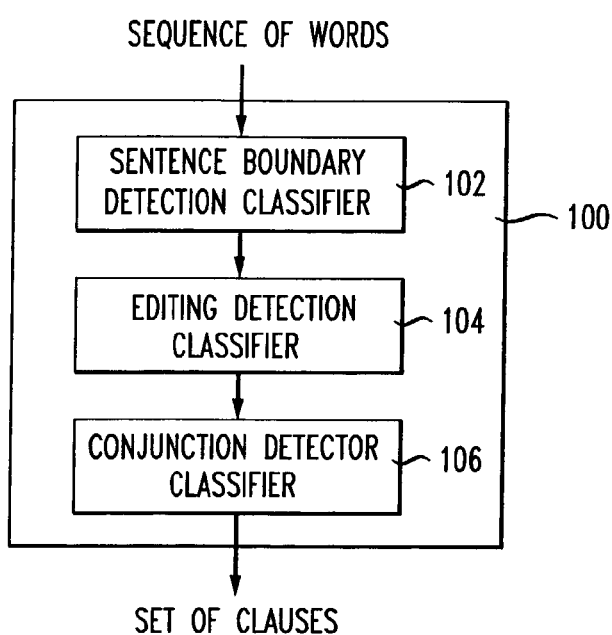
FIG. 1 illustrates a preferred architecture for a clausifier.
Figure 2:
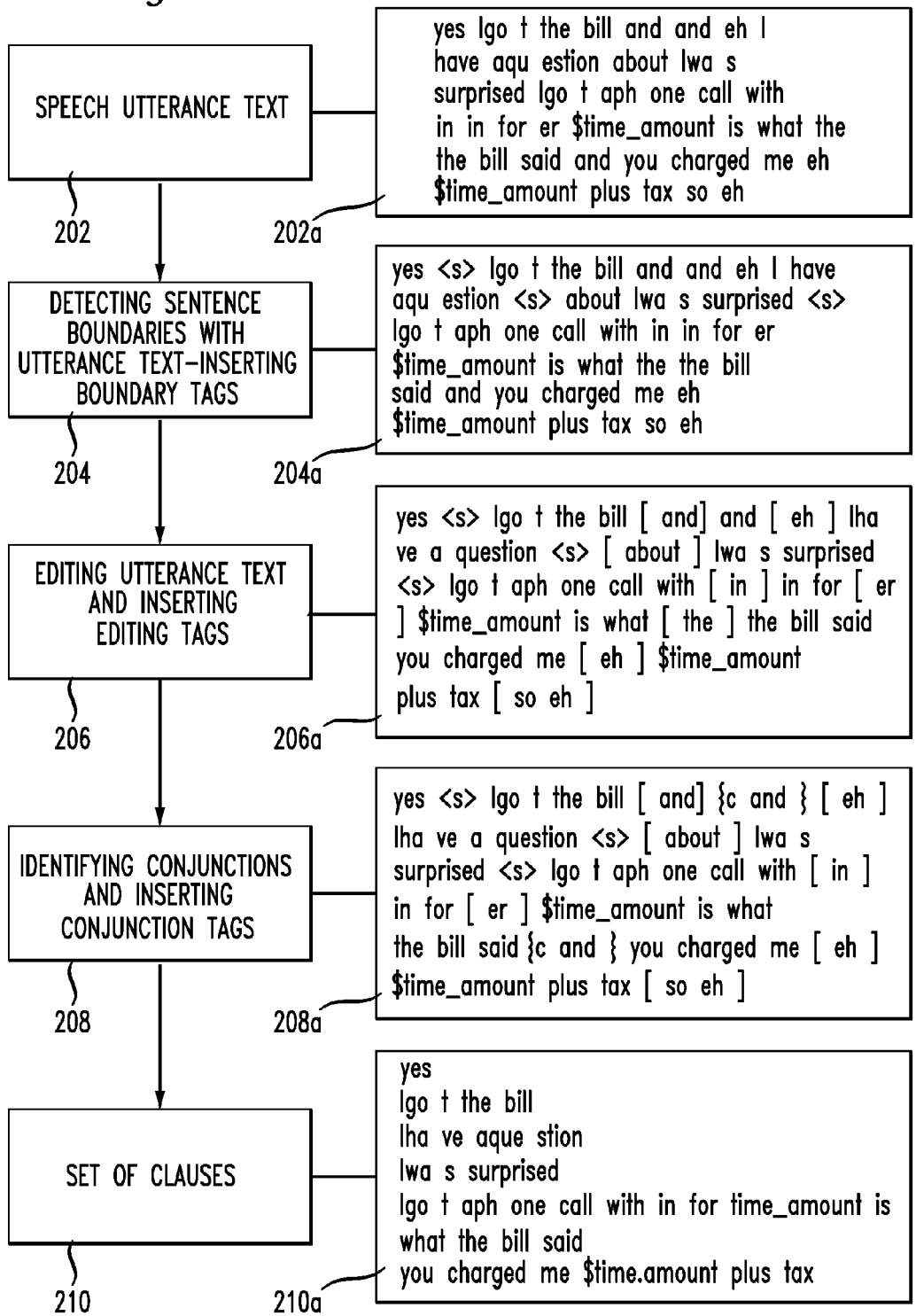
FIG. 2 illustrates a method according to an embodiment of the invention with example text and tagging elements.

The present invention may be understood with reference to FIGS. 1 and 2. Spontaneous human utterances in the context of human-human and human-machine dialogs are rampant with dysfluencies and speech repairs. Furthermore, when recognized using a speech recognizer, these utterances produce a sequence of words with no identification of clausal units. The output from a speech recognizer is a long string of words combined with speech errors, no punctuation, and other deficiencies. These pose a difficult problem for spoken language parsing and understanding. The present invention addresses the issue of editing speech repairs as well as segmenting user utterances into clause units with a view toward parsing and understanding spoken language utterances. Disclosed herein are generative and discriminative models for this task and some evaluation results on the human-human conversations obtained from a switchboard corpus. These models operate on well-known computer devices such as computer servers that operate in the context of a spoken dialog service. These computer devices are well-known to those of skill in the art.

FIG. 1 illustrates an exemplary clausifier or software module 100 according to the first embodiment of the invention. This pipeline architecture making annotations in three stages is preferred because it is more suited than a single classifier that predicts all the annotations in a single step. Observations show that typically edits and speech repairs do not go across sentence boundaries. However, although the preferred embodiment is three classifiers, the present invention is not limited to three classifiers and may involve the steps being performed by one or more classifiers.

The clausifier 100 receives as input a sequence of words or text. In most cases, such as in the context of a spoken dialog system, the text is the resulting output from a speech recognition module that converts user utterances into text. The purpose of the clausifier 100 is to isolate and identify clauses from the received user utterance text. As mentioned above, the utterance text is not punctuated, likely not grammatically correct, and may be jeopardized by recognition errors. The clausifier 100 annotates its input with tags that help it in segmenting the input into clauses. The <s> tag is used to indicate sentence boundaries, strings within brackets "[" and "]" are edited-out strings and strings between "{c" and "}" indicate coordinating conjunctions. These tags are then interpreted to retrieve the set of clauses. An example illustrating the input, the annotated output and the set of clauses resulting from interpreting the output is shown in FIG. 2 and described below.

The clausifier 100 in FIG. 1 is shown with three components or modules: a sentence boundary classifier 102, an editing detection classifier 104 and a conjunction detection classifier 106. These are preferably called "classifiers" but may be any software module or other component that performs a similar function. For example, a classifier was built using Boostexter classifier written in the C programming language. Scripts were used to handle the output to input connections for the sequence of the classifiers. A commercial version may or may not use scripts but preferably would be written into a single program. The sentence boundary classifier 102 performs the task of detecting sentence boundaries and inserting the boundary tags <s> in appropriate locations within the utterance text. Next the utterance text with boundary tags is transmitted to the editing detection classifier 104 that determines which words to edit out from the utterance text. The editing detection classifier 104 inserts the appropriate editing brackets to indicate its decisions. Finally, the conjunction detection classifier 106 analyzes the utterance text and inserts conjunction tags to indicate coordinating conjunctions. These are breaks that are not sentence breaks but may identify clauses within a compound sentence. FIG. 2 illustrates exemplary utterance text and tag insertion for the various classifiers.

As shown in FIG. 2, the method utilizes received text that is typically obtained from a speech utterance as recognized by an automatic speech recognition module. Box 202a provides example text. The terms "$time_amount" and "$dollar_amount" relate to an identified named entity. The speech fragments and errors in recognition can be recognized in the text.

Also notable is the lack of punctuation and repeated words as well as other words such as "eh" that is often found in speech utterances and are some times referred to as speech fillers.

The first step in the method comprises detecting sentence boundaries within the utterance text (204) and inserting boundary tags such as <s> to identify the boundaries within the utterance text. Other kinds of tags may also be selected to indicate such a boundary. Box 204a illustrates the utterance text with the inserted sentence boundary tags. Although the preferred embodiment of the invention involves detecting sentence boundaries, other kinds of boundaries may be identified such as phrase boundaries or paragraph boundaries.

The next step comprises editing the utterance text (206). The purpose of the editing step is to identify and remove unwanted or undesirable text such as repeated words or other stray words that do not contribute to language understanding. For example, as shown in text box 206a, words like "eh" and repeated words are removed. This step may also involve inserted edit tags such as "[" and "]" to identify words to be removed. In another aspect of the invention, the words are not removed from the text but remain with the identifying tags inserted; later on in the spoken language understanding phase, a parser or spoken language understanding unit will know to ignore the edited words.

The next step comprises identifying conjunctions within the utterance text (208). The goal of this step is to further identify clauses within the utterance text. Coordinating conjunctions within the utterance text may be words like "and" or no words at all but may relate to an identifiable break in a clause. Thus, note the utterance text in box 208a with inserted conjunction tags "{c" and "}" to isolate clauses within the text. In both cases where conjunctions tags are inserted in the text, they are around the word "and." The result, as is shown in the text box 210a where in the clauses are listed, is the removal of the word "and" and the beginning of a new clause in the clause set. The result from the method set forth in FIG. 2 is a set of clauses 210 as illustrated in box 210a. The tags are interpreted to retrieve the set of clauses.

One method of training models for the clausifier is to encode the edit and conjunction information as tags following a word. These tags also contain span information. For example, the tag <Edit1> indicates an edit of one word to the left, and the tag <Edit2> indicates an edit of two words to the left and so on. A similar encoding, such as <Con1> and <Con2>, is used for coordinating conjunctions. The following text illustrates encoding used to train the models:

yes <a> I got the bill and <Editl> and <Conjl> eh <Editl> I have a question <S> about <Editl> I was surprised <a> I got a phone call with in <Edjtl> in for er <Edit1> $timeamount is what the <Edit1> the bill said and <Conj1> you charged me eh <Edit1> $dollar_amount plus tax so eh <Edit2>

The task of annotating the input can be viewed as a tagging problem. Each word of the input is tagged with one of a few tags that indicate the type of annotation following the word. In particular, the inventors consider the presence of a sentence boundary tag <s> and its absence <nos> as two possible tags to associate with each word. An n-gram tagging model as shown in equation 1 may then be used to retrieve the best tag sequence for a given input sentence.

$$P(T) = \operatorname{argmax}_T P(w_i|t_i) * P(T_i|t_{i-1}, T_{i-2}) \quad (1)$$

The discriminative classification approach to the clausifier of the present invention enables the addition of a larger number of features than in a generative n-gram model. Specifically, in a discriminative approach, syntactic features both before and after the word that is being tagged can be considered. In contrast, in a generative n-gram approach, only the features before the word that is being tagged can be sued. Clearly, usage of additional features in tagging/classifying a word boundary provides more accurate decisions.

Preferably, the present invention uses the Boostexter machine-learning tool, which is based on the boosting family of algorithms. See, R. E. Schapire, "A brief introduction to boosting" in *Proceedings of the Sixteenth International Joint Conference on Artificial Intelligence*, 1999. This invention is not limited to usage of Boostexter for learning classification models. Any machine-learning tool can be used for this purpose. The basic idea of boosting is to build a highly accurate classifier by combining many "weak" or "simple" base classifiers, each one of which may only be moderately accurate. To obtain these base classifiers, it is assumed that a base learning algorithm is available that can be used as a black-box subroutine. The collection of base classifiers is iteratively constructed. On each iteration, the base learner is used to generate a base classifier $h_t$. Besides supplying the base learner with training data, the boosting algorithm also provides a set of non-negative weights $w_t$ over the training examples. Intuitively, the weights encode how important it is that $h_t$ correctly classifies each training example. Generally, the examples that were most often misclassified by the preceding base classifiers will be given the most weight so as to force the base learner to focus on the "hardest" examples. As described in R. E. Schapire and Y. Singer "Improved boosting algorithms using confidence-rated predictions," *Machine Learning*, vol. 37, no. 3, pp. 297-336, 1999, Boostexter uses confidence rated classifiers h that, rather than providing a binary decision of −1 or +1, output a real number h(x) whose sign (−1 or +1) is interpreted as a prediction, and whose magnitude |h(x)| is a measure of "confidence." The output of the final classifier f is f(s)=the sum of confidence of all classifiers $h_t$. The real-valued predictions of the final classifier f can be converted into probabilities by passing them through a logistic function; that is, we can regard the quantity $1/(1+e^{-f(x)})$ as an estimate of the probability that x belongs to class +1. In fact, the boosting procedure is designed to minimize the negative conditional log likelihood of the data under this model, namely the sum over i of $\ln(1+e^{-y_i f(x_i)})$.

The extension of Boostexter to the multiclass problem is described in the literature. Boostexter does not overfit the training data and therefore it is the preferable tool to deal with independent variables of type text.

FIG. 1 shows the three different components of the clausifier one each for the tasks of detecting sentence boundaries, detecting speech repairs and detect coordinating conjunctions.

All the classifiers shown in FIG. 1 are preferably designed to classify a word boundary into either a sentence boundary tag, an edit tag or a conjunction tag. A set of features of a word boundary is used as independent variables. Some available features are listed below in Table 1.

TABLE 1

| | |
|---|---|
| word$_{-i}$ | 3 words to the left; 'bos' if there is no word |
| word$_i$ | 3 words to the right; 'eos' if there is no word |
| pos$_{-i}$ | POS of three words to the left |
| pos$_i$ | POS of three words to the right |
| w1 | 1 if word$_1$ = word$_{-1}$; otherwise 0 |
| w2 | # of words common in 2 left and 2 right words |
| w3 | # of words common in 3 left and 3 right words |
| p1 | 1 if POS$_i$ = POS$_{-i}$; otherwise 0 |
| p2 | # of POS common in 2 left and 2 right POS |
| p3 | # of POS common in 3 left and 3 right POS |

Table 1 is not meant to be an exclusive list of the syntactic features available. Features similar to those listed in table 1, such as dysfluencies like explicit edit, discourse markers and speech fillers (like urns and hums), may also be used.

The inventors have studied improvements by applying the principles of the present invention. The results of several experiments for the baseline n-gram model for sentence boundary detection and the classifier models for detecting the three components of the clausifier are provided below.

Transcribed and annotated human-human conversations present in a Switchboard corpus were used for study. An annotation scheme for this data was described in M. Meteer et al., "Dysfluency annotation stylebook for the switchboard corpus," in *Distributed by LDC,* 1995, incorporated herein as background material. In this data, since sentences can span over turns, the inventors collapsed each side (side A and side B) of a dialog as a single string of words with turn markings. This resulted in total of 2242 annotated strings. All annotations were removed except for (a) the segment boundary, (b) turn boundary, (c) restarts and repairs, and (d) coordinating conjunctions. Some of the strings that had complex nested restarts and repairs were dropped from consideration. This left 2061 annotated strings with approximately 660,000 words (excluding annotations). These strings were randomly partitioned in two sets: 1879 for training various classifiers and 185 for testing them. All the results are based on this training and test data.

The inventors evaluated various models on the test set and compared the resulting annotation against a hand-annotated version of the test set. Recall and precision scores are reported on each of the individual tags as well as the total error rate and the baseline error rate for each tagging task. Since future work relates to parsing and understanding the resulting clauses, the inventors also report recall and precision after each of the annotations are interpreted (i.e., after utterances are split at segment boundaries, after edits are deleted and after utterances are split at conjunctions). These scores are reported under the "Sentence" column of each model's performance table.

In the annotated data, the inventors found in many cares square brackets (D and curly braces (0 were not balanced. Ignoring such a string would not leave enough data. The inventors therefore wrote a heuristic program that balanced such cases.

Table 2 shows the results of using a 3-gram model for sentence boundary detection on the data described above. The table consists of results with and without (within parenthesis) usage of part-of-speech (POS) of the words in the text. Instead of using the true POS tags, the inventors used the result of tagging from an n-gram part-of-speech tagger. See, Kenneth Ward Church, "A Stochastic Parts Program and Noun Phrase Parser for Unrestricted Text," in $2^{nd}$ *Applied Natural Language Processing Conference*, Austin, Tex., 1988. In addition to providing recall and precision scores on the individual segmentation decision, the inventors also provide sentence level performance. Notice that segmentation precision and recall of approximately 80% and 52% turn into sentence-level precision and recall of 50% and 32% respectively. Also note that including POS improves the performance by approximately 1%.

TABLE 2

| | No Segment | Segment | Sentences |
|---|---|---|---|
| Counts | 57454 | 10284 | 10654 |
| Recall (%) | 98.13(98.02) | 52.79(52.26) | 32.55(31.53) |

TABLE 2-continued

|  | No Segment | Segment | Sentences |
|---|---|---|---|
| Precition (%) | 92.07(91.98) | 83.47(79.36) | 50.94(49.29) |
| Total Error | 9.23(9.93) | | |
| Baseline Error | 15.18 | | |

Training data for the discriminative classifiers may be prepared by extracting lexical features—shown in Table 1 for each word boundary—and labeling it with an appropriate tag. For training the sentence boundary classifier, training data is labeled with "segment" or "no segment." To train the edit classifier, the label for features of each word boundary is chosen from "No Edit", "Edit One", "Edit Two", "Edit Three" and "Edit Four" implying the number of words on the left of the word boundary that should be edited out. Finally, to train the conjunction classifier, the labels are chosen from "One Conj", "Two Conj" and "No Conj" implying the number of words on the left of the word boundary that are coordinating conjunctions. Apart from training individual classifiers for sentence boundary, edit and conjunction classifiers, a combined classifier may also be trained that performs all three tasks in one step and does not make any independence assumptions as shown in FIG. 1. To train such a classifier, features of the word boundaries are labeled with one or more labels from the complete set of labels mentioned above.

Table 3 shows the performance of a combined classifier that predicts all three types of tags for each word boundary. Since this classifier makes all the decisions, output of this classifier can be directly used to generate clauses from input strings of words. As expected, this classifier outperforms the N-gram based classifier both at the segmentation decision level and at sentence level.

TABLE 3

|  | No Action | Edit One | Edit Two | Edit Three | One Conj | Two Conjs | Segment | Sentence |
|---|---|---|---|---|---|---|---|---|
| Counts | 53666 | 973 | 332 | 108 | 2066 | 138 | 10177 | 11007 |
| Recall (%) | 96.55 | 37.89 | 27.41 | 15.74 | 88.29 | 85.51 | 76.74 | 54.32 |
| Prec (%) | 93.82 | 71.93 | 57.96 | 60.71 | 83.33 | 87.41 | 83.98 | 53.07 |
| Total Error | 8.15% | | | | | | | |
| Baseline Error | 20.55% | | | | | | | |

Tables 4, 5, and 6 show the performance of the three classifiers used in the cascade shown in FIG. 1. In these tables sentence level performances are shown with respect to their own inputs and outputs. Overall sentence level performance is shown in Table 7. These tables show that cascaded classifiers are significantly more accurate at making individual decisions that result in higher recall and precision at sentence level.

TABLE 4

|  | No Segment | Segment | Sentences |
|---|---|---|---|
| Counts | 68507 | 11413 | 11452 |
| Recall (%) | 97.93 | 79.36 | 58.54 |
| Precision (%) | 96.61 | 86.47 | 63.77 |

TABLE 4-continued

|  | No Segment | Segment | Sentences |
|---|---|---|---|
| Total Error | 4.72% | | |
| Baseline Error | 14.28% | | |

TABLE 5

|  | No Edit | Edit One | Edit Two | Edit Three | Edit Four | Sentences |
|---|---|---|---|---|---|---|
| Counts | 58752 | 1202 | 326 | 103 | 36 | 11314 |
| Recall (%) | 99.43 | 53.11 | 39.51 | 13.00 | 2.86 | 91.69 |
| Precision (%) | 98.52 | 79.6 | 83.33 | 54.17 | 100 | 91.67 |
| Total Error | 1.79% | | | | | |
| Baseline Error | 2.76% | | | | | |

TABLE 6

|  | No Conj | One Conj | Two Conj | Sentence |
|---|---|---|---|---|
| Counts | 55798 | 2154 | 115 | 11793 |
| Recall (%) | 99.67 | 92.9 | 92.17 | 95.54 |
| Precision (%) | 99.71 | 92.34 | 85.48 | 94.82 |
| Total Error | 1.59% | | | |
| Baseline Error | 3.91% | | | |

TABLE 7

|  | Sentence Level |
|---|---|
| Counts | 11007 |
| Recall (%) | 54.63 |
| Precision (%) | 56.88 |

A clausifier has been disclosed that could be used as a preprocessor in the context of a speech parsing and understanding system. The clausifier preferably contains three classifiers that are trained to detect sentence boundaries, speech repairs and coordinating conjunctions. These models have been trained and tested on a Switchboard corpus and provide an end-to-end recall and precision of 55% and 56% respectively for the task of clause identification. Classifier models clearly outperform the n-gram models, and a combined model does not perform as well as a model that makes individual predictions. However, the inventors consider any number of classifiers as within the scope of the invention. The sentence level performance can be improved further by considering other annotated features such as explicit editing, and discourse makers, which were ignored in these experiments, and by improving the training data quantity and quality. In the switchboard data, the average turn length is six, and the turn boundaries are a very strong indicator of the sentence boundaries. This makes it hard for the classifier to learn other discriminating features. To combat this problem, the inventors will use this system to iteratively annotate additional data with longer turn lengths, manually correct it and retrain the mode.

The results given herein are only for illustration purposes and do not limit the scope of the invention. For example, the invention is not limited to only training on switchboard corpus. The general procedure disclosed herein is for building a clausifier and is not limited to any particular clausifier, the performance and evaluation of which is provided in this disclosure. Further, the reported performance evaluation here would clearly change if a person used a larger and more consistently labeled database that could be used to create a superior clausifier. However, the same basic approach disclosed herein would still be used.

Embodiments within the scope of the present invention may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the invention may be practiced in network computing environments with many types of computer system configurations, including personal computers, hand-held devices, multi-processor systems, microprocessor-based or programmable consumer electronics, network PCs, mini-computers, mainframe computers, and the like. Embodiments may also be practiced in distributed computing environments where local and remote processing devices perform tasks that are linked (either by hardwired links, wireless links, or by a combination thereof) through a communications network. In a distributed computing environment, program modules may be located in both local and remote memory storage devices.

Although the above description may contain specific details, they should not be construed as limiting the claims in any way. Other configurations of the described embodiments of the invention are part of the scope of this invention. For example, although the preferred embodiment is to employ a cascade of three classifiers in the clausifier, any two classifiers may be collapsed into one thus making the clausifier a cascade of two classifiers. Further, any of the three classifiers could have its task broken into two tasks, thus adding classifiers to the cascade for three or more classifiers in the clausifier. In addition, different feature sets for classification may be employed in addition to those discussed herein. The present invention is not limited to any particular feature set. Therefore, the number of classifiers from one to a plurality may be employed to accomplish the tasks set forth above in generating a set of clauses.

In another aspect of the invention, although the inventors mention above that three words to the left and three words to the right of the word boundary are used to extract features (POS and similarity among them), the invention is not limited to using three words in that the concepts within the scope of the invention and easily contemplated to expand to using more than three words. Accordingly, the appended claims and their legal equivalents should only define the invention, rather than any specific examples given.

We claim:

1. A system comprising:
   a processor; and
   a computer-readable medium having instructions stored which, when executed by the processor, cause the processor to perform operations comprising:
   inserting, via a discriminative classification approach independent of an n-gram approach, boundary tags, word by word, into speech utterance text, the boundary tags identifying boundaries selected from a group consisting of phrase boundaries, sentence boundaries, and paragraph boundaries, wherein the discriminative classification approach utilizes syntactic features before and after each word being tagged, to yield boundary marked speech utterance text;
   thereafter, inserting, via the discriminative classification approach, edit tags in the boundary marked speech utterance text to identify at least one word of a set of duplicated words, to yield edited text and unedited text, wherein each edit tag comprises edit span information indicating how many words to the left of each edit tag to edit;
   thereafter, identifying coordinating conjunctions within the unedited text based on a conjunction tag, to yield identified coordinating conjunctions, wherein the conjunction tag comprises conjunction span information indicating how many words to the left of the conjunction tag a corresponding conjunction includes; and
   identifying clauses in the speech utterance text based on the boundary marked speech utterance text, the edited text, and the identified coordinating conjunctions.

2. The system of claim 1, the computer-readable medium having additional instructions stored which result in the operations further comprising inserting editing tags into the speech utterance text.

3. The system of claim 2, the computer-readable medium having additional instructions stored which result in the operations further comprising inserting conjunction tags into the speech utterance text.

4. A method comprising:
- inserting, via a discriminative classification approach independent of an n-gram approach, boundary tags, word by word, into speech utterance text, the boundary tags identifying boundaries selected from a group consisting of phrase boundaries, sentence boundaries, and paragraph boundaries, wherein the discriminative classification approach utilizes syntactic features before and after each word being tagged, to yield boundary marked speech utterance text;
- thereafter, inserting, via a processor and via the discriminative classification approach, edit tags in the boundary marked speech utterance text to identify at least one word of a set of duplicated words, to yield edited text and unedited text, wherein each edit tag comprises edit span information indicating how many words to the left of each edit tag to edit;
- thereafter, identifying coordinating conjunctions within the unedited text based on a conjunction tag, to yield identified coordinating conjunctions, wherein the conjunction tag comprises conjunction span information indicating how many words to the left of the conjunction tag a corresponding conjunction includes; and
- identifying clauses in the speech utterance text based on the boundary marked speech utterance text, the edited text, and the identified coordinating conjunctions.

5. The method of claim 4, wherein the edit tags indicate a portion of the boundary marked speech utterance text to remove.

6. The method of claim 5, further comprising inserting the conjunction tag within the edited text.

7. The method of claim 4, wherein a different classifier performs each step of the method.

8. The method of claim 4, wherein a single classifier performs all the steps of the method.

9. The method of claim 4, wherein a plurality of classifiers perform all the steps of the method.

10. A computer-readable storage device having instructions stored which, when executed by a processor, cause the processor to perform operations comprising:
- inserting, via a discriminative classification approach independent of an n-gram approach, boundary tags, word by word, into speech utterance text, the boundary tags identifying boundaries selected from a group consisting of phrase boundaries, sentence boundaries, and paragraph boundaries, wherein the discriminative classification approach utilizes syntactic features before and after each word being tagged, to yield boundary marked speech utterance text;
- thereafter, inserting, via the discriminative classification approach, edit tags in the boundary marked speech utterance text to identify at least one word of a set of duplicated words, to yield edited text and unedited text, wherein each edit tag comprises edit span information indicating how many words to the left of each edit tag to edit;
- thereafter, identifying coordinating conjunctions within the unedited text based on a conjunction tag, to yield identified coordinating conjunctions, wherein the conjunction tag comprises conjunction span information indicating how many words to the left of the conjunction tag a corresponding conjunction includes; and
- identifying clauses in the speech utterance text based on the boundary marked speech utterance text, the edited text, and the identified coordinating conjunctions.

11. The computer-readable storage device of claim 10, wherein the edit tags indicate a portion of the boundary marked speech utterance text to remove.

12. The computer-readable storage device of claim 11, the computer-readable storage device having additional instructions stored which result in the operations further comprising inserting a conjunction tag within the speech utterance text.

* * * * *